United States Patent
Arroyave-Garcia et al.

(10) Patent No.: US 6,470,812 B1
(45) Date of Patent: Oct. 29, 2002

(54) METHOD AND APPARATUS FOR RECOVERING ENERGY FROM WASTES BY COMBUSTION IN INDUSTRIAL FURNACES

(75) Inventors: Jose Luis Arroyave-Garcia, Estado de Hidalgo; Jorge Berrun-Castanon, Estado de Nuevo Leon; Juan Manuel Diosdado, Estado de Nuevo Leon; Luis Farias, Estado de Nuevo Leon; Armando J. Garcia, Edo. de Nuevo Leon; Javier Garza-Ondarza, Edo. de Nuevo Leon; Simon Gonzalez-Guerra, Edo. de Nuevo Leon; Ignacio M. Mayoral-Rodriguez, Edo. de Hidalgo; Juan Jose Morales-Peregrina, Edo. de Hidalgo; Alejandro Padilla-Cortez, Edo. de Hidalgo, all of (MX)

(73) Assignee: Cemex, S.A. de C.V., Mexico D.F. (MX)

( * ) Notice: Subject to any disclaimer, the term of this patent is extended or adjusted under 35 U.S.C. 154(b) by 0 days.

(21) Appl. No.: 09/445,195
(22) PCT Filed: Jun. 11, 1998
(86) PCT No.: PCT/IB98/00925
§ 371 (c)(1),
(2), (4) Date: Jul. 27, 2000
(87) PCT Pub. No.: WO98/56728
PCT Pub. Date: Dec. 17, 1998

(30) Foreign Application Priority Data

Jun. 11, 1997 (MX) ................................................ 974324

(51) Int. Cl.$^7$ .............................. F23G 5/00; F27B 7/02
(52) U.S. Cl. ................. 110/346; 110/203; 110/204; 110/226; 110/233; 110/246; 110/255; 432/106
(58) Field of Search ................. 432/58, 106, 14; 110/341, 342, 346, 347, 203, 204, 226, 228, 233, 235, 246, 255, 104 R, 105, 108

(56) References Cited

U.S. PATENT DOCUMENTS

| | | | | |
|---|---|---|---|---|
| 3,592,151 A | * | 7/1971 | Webber | 110/8 E |
| 3,863,577 A | * | 2/1975 | Steever et al. | 110/8 R |
| 3,947,238 A | * | 3/1976 | Fukuda et al. | 432/14 |
| 3,986,818 A | * | 10/1976 | Deussner et al. | 432/14 |
| 4,071,310 A | * | 1/1978 | Ghesteem | 432/106 |
| 4,381,916 A | * | 5/1983 | Warshawsky | 432/14 |
| 4,514,170 A | * | 4/1985 | Kupper | 432/106 |
| 4,640,203 A | * | 2/1987 | Wolter | 110/346 |
| 4,658,736 A | * | 4/1987 | Walter | 110/346 |
| 4,678,514 A | * | 7/1987 | Deyhle | 106/100 |
| 4,808,108 A | * | 2/1989 | Tiggesbaumker et al. | 432/14 |
| 4,815,970 A | * | 3/1989 | Unland et al. | 432/106 |
| 5,049,198 A | * | 9/1991 | Ribas | 106/739 |
| 5,122,189 A | * | 6/1992 | Garret | 106/745 |
| 5,349,910 A | * | 9/1994 | Hundebol | 110/346 |
| 5,388,537 A | * | 2/1995 | Larson et al. | 110/346 |
| 5,634,414 A | * | 6/1997 | Camacho | 110/346 |
| 5,846,378 A | * | 12/1998 | Phipps | 162/29 |
| 5,975,891 A | * | 11/1999 | Hundebol | 432/14 |

\* cited by examiner

*Primary Examiner*—Ira S. Lazarus
*Assistant Examiner*—K. B. Rinehart
(74) *Attorney, Agent, or Firm*—Frommer Lawrence & Haug LLP; A. Thomas Safford

(57) ABSTRACT

Method and apparatus to recover energy from waste by means of combustion of such waste in industrial furnaces, particularly of the rotary type, that has an external calciner, feeding such waste into the tertiary air duct of the calciner and burning the waste inside the duct itself, to efficiently make use of the energy produced by such combustion, as a contribution of the total cost of fuel necessary to operate the industrial furnace. The method and apparatus permit the elimination of hazardous wastes that are efficiently disassociated when burned sufficiently to produce effluents that are typically non-toxic, producing greatly reduced or even no atmospheric pollution nor environmental damage.

29 Claims, 6 Drawing Sheets

US 6,470,812 B1

METHOD AND APPARATUS FOR RECOVERING ENERGY FROM WASTES BY COMBUSTION IN INDUSTRIAL FURNACES

RELATED APPLICATIONS

This application is the national phase of PCT/IB98/00925, filed Jun. 11, 1998, designating the U.S. and published as WO 99/56728, claiming priority from Mexican patent application no. 974324, filed Jun. 11, 1997.

BACKGROUND OF INVENTION

This invention discloses and claims an improved method and equipment to recover energy from wastes by combustion of same in industrial furnaces.

This invention allows an efficient use of the heating power of volatile components in waste materials, preferably solids whether in bulk or crushed, such as vehicle tires, bags, bales, bulk material that may be contained in tanks, barrels, etc. to dramatically reduce fuel consumption expenses in large capacity industrial furnaces, particularly of the rotary kiln type, used in the cement or similar industries.

In the past, the need to diminish as much as possible the amount of solid, gas or liquid primary fuel that needs to be burned in large capacity industrial furnaces, in order to achieve a more efficient and productive operation of the same at a lower cost, has been recognized.

On the other hand, it has been found, that all industrial processes in general produce waste that can be burned. Many such wastes, because of their special inflammability and/or toxicity features, have been classified as hazardous waste that need to be handled with great care and deposited in distant locations, away from populated urban centers, where a degree of certainty can be achieved that they will not produce pollution to harm the environment. The above situation has promoted building the so-called garbage and waste cemeteries, as well as the famous "sanitary land fills", where the aforementioned toxic waste is buried and covered by large amounts of soil, to avoid any contact with the atmosphere or the people.

In the cement industry all over the world, rotary furnaces requiring large amounts of fuel, particularly of the liquid and gas types to achieve the high temperatures needed, in the range of 1200° C. to 1900° C., have been used. These temperatures are capable of burning or incinerating all sorts of materials that may be fed to such furnaces. Thus, obviously, a means to diminish the amount of traditional higher-cost fuel required to operate a cement furnace would be to feed into the furnace other fuel in the form of waste materials that will contribute to reducing fuel costs for such equipment.

Also evident, is the fact that the rotary furnaces mentioned above, are in themselves highly effective and efficient devices for elimination of hazardous waste through full and absolute combustion, due to the high temperatures they reach. They are capable of disintegrating hazardous waste into their more basic components, such as carbon dioxide, nitrogen gases, etc. which are no longer hazardous either to the environment nor to people. Also combustion residues from many waste materials classified as hazardous may be safely incorporated in the cement clinker product as an environmentally safe use.

Attempts have been made in industrialized countries, since the end of the past century, to reduce fuel costs for the cement industry in general and for rotary furnaces in particular; to try to optimize the combustion conditions of such fuels, and in place of traditional fuels to substitute organic fuel material having a very low cost. Among the latter, all sorts of organic waste and even "garbage" can be found. In some cases these could have a minimal cost, which is generally represented only by the cost of handling and transportation to the plant site where they will be burned, and thus they are extremely useful.

In the United States of America and other industrial countries, many efforts have been made to develop methods and equipment that will benefit from burning combustible materials in industrial furnaces at high temperatures, in order to reduce fuel costs and to eliminate industrial waste.

Examples of the somewhat more relevant prior art are EPO patent number 0 582 394 A1 and the more pertinent of the patents cited therein and therewith;

namely, U.S. Pat. No. 4,295,823; French patent number 2,548,660; and U.S. Pat. No. 4,645,452 (which latter is equivalent to the French language EPO patent number 0 140 771). The contents of the foregoing and other patents cited in this application are incorporated herein by reference.

The Jul. 14, 1993, European patent application number 0 582 394 A1 discloses a modification of a conventional cement kiln plant with a rotary kiln for producing cement clinker having a downstream cooler and an upstream calciner and preheater (the preheater being a typical cascade of cyclone separators). A tertiary air duct conventionally conveys hot air from the clinker cooler to the intake to the calciner. Added to this conventional structure is a separate decomposition chamber for converting waste material into combustible gas by means of heat derived from injection of a portion of the preheated and calcined cement raw meal particles into the decomposition chamber.

There is no teaching of injection of the waste materials simply directly into the tertiary air duct. The EPO publication instead teaches a significantly more complex apparatus requiring not only significant added capital cost, but also more complicated control variables. The decomposition chamber is taught to be optionally formed as a spouted bed, a fluidized bed, or a rotatable drum.

The aforementioned European patent application characterizes the Oct. 20, 1981, U.S. Pat. No. 4,295,823 as utilizing the exhaust gases from the rotary kiln for the decomposition of waste and notes that such a method makes it difficult for the kiln gases to move up through the decomposition chamber in a controlled flow due to the high temperature and further that such utilization of the kiln gases for decomposition of the waste materials will have a disturbing effect on the draft conditions of the kiln system.

This U.S. Pat. No. 4,295,823 shows six different embodiments, one in each of the six drawings, all of which have the common feature of utilizing the exhaust gas from the rotary kiln in the upstream decomposition of the waste material. In FIG. 1 no tertiary air duct is shown at all. In FIGS. 2 and 3, there is no flow of the tertiary air from duct (61) through the decomposition chamber (18 or 73). In none of the six figures is there a direct feeding of the waste material into the tertiary air duct itself. Also none of the disclosed embodiments teach any decomposition of the waste material by means of the tertiary air alone. In FIGS. 4, 5 and 6, tertiary air is discharged from the tertiary air duct and mixed in a separate chamber with exhaust gas from the kiln and the resulting mixture is used to decompose the waste materials. All of these six variations have the common disadvantage emphasized at the top of page two of the aforementioned European patent.

Included in the aforementioned European publication is a search report listing six references, four being related only to technology background, but two being indicated to be relevant in combination. The latter two are the aforementioned French patent 2,548,660 and the European equivalent of U.S. Pat. No. 4,645,452. The French patent teaches injection of the waste materials in very small sized particles into a fluidized bed reactor which serves as the calciner (5) and utilizes the tertiary air (8 & 9) from the clinker cooler (16 & 18) as the fluidizing medium. Again there is absolutely no teaching of direct injection of waste materials into the tertiary air duct (the decomposition in the patent's apparatus instead taking place in an entirely separate vessel structure).

The same is true of the U.S. Pat. No. 4,645,452 where a portion of the tertiary air from the clinker cooler is fed to a rather complex fluidized bed separate decomposition chamber 10 which thereafter feeds the calciner and ultimately one of two sets of parallel preheaters.

The following patents give a further historical background showing the long felt need and slow development in this field, and more particularly are directed to the mechanisms for feeding waste to rotary furnaces.

In U.S. Pat. No. 2,813,822 issued on Nov. 19, 1957, Mr. Robert T. Collier discloses equipment and methods for burning petroleum coke, coal, and similar substances containing volatile fuel material. According to this patent, the feed occurs approximately half-way along the body of the rotary furnace, by means of transverse scoops that rotate simultaneously with the furnace's body to which they are affixed. These scoops pick up waste from a lower repository and introduce such waste into the furnace when the vertical position is reached, where such waste is dropped due to gravity.

The foregoing patent has several disadvantages. For example, the feeding of wastes is not performed at the point of highest combustion efficiency in the rotary furnace. Also, since there is open communication between the body of the furnace and the coupling points for the scoops, where the waste is introduced, combustion gas is permitted to exit. Consequently, the contribution of the waste to reduce fuel consumption is very poor. This type of alternate fuel, when sufficient oxygen is found in the furnace gases, causes the formation, in furnaces with a calciner, of a hot spot that permits partial formation of a liquid phase with sufficient increase in adhesion between the particles to result in agglomeration, forming an internally adherent crust or rings, causing energy inefficiency (such as higher consumption of electrical power due to a higher drop in pressure, etc.). Additionally, there are operative problems from dust retention behind such rings.

More recently, U.S. Pat. No. 4,466,361 issued Aug. 21, 1984 to Maurice D. Henry et al. A method and equipment for incineration of waste is claimed. This involves the use of a pre-treatment agent to ensure waste material inflammability. The furnace is also fed by means of a rotary scoop, and thus the operational cost is increased due to the need to purchase the above mentioned agent. Also present are the disadvantages related to U.S. Pat. No. 2,813,822 discussed above.

In Jul. 25, 1989, U.S. Pat. No. 4,850,290 issued to Mr. Michel R. Benoit, et al, granting protection to a method to recover energy from hazardous solid waste, which is mixed with other non hazardous wastes and packed in sealed drums. The drums are used as fuel, being loaded directly inside a cement rotary furnace through an open hatch in the body of the rotary furnace that rotates with the same.

The latter invention constitutes an improvement on the preceding above-mentioned inventions, since the feeding hatch can be opened and closed at will. However, it has disadvantages due to the fact that since the hatch is rotating, only one drum can only be fed for every full turn of the rotary furnace. This is a serious limitation. In addition, the patent retains many of the disadvantages already described for the other above-mentioned inventions directed to feeding a rotary furnace.

U.S. Pat. No. 4,930,965 granted to Charles D. Peterson, et al, on Jun. 5, 1990, covers equipment for loading solid fuel into rotary furnaces. This is similar to U.S. Pat. No. 4,850, 290. It shows the improvement of closing the cover (that immediately operates after feeding a fuel waste drum into the rotary furnace).

Also, on Jan. 15, 1991, U.S. Pat. No. 4,984,983 was granted in the name of Mr. Torbean Enkegaards, to protect a method and equipment to burn organic waste, by means of which the same are directly introduced into the combustion area of a rotary industrial furnace, and are burned simultaneously with raw materials for the manufacture of cement. In this patent, solid combustible waste is no longer introduced separately and additionally into the rotary furnace, but it is mixed with cement's raw materials to be simultaneously incinerated. This also has disadvantages, since the furnace's operation itself is degraded and all operational conditions are substantially altered. Additionally, the resulting product's composition is also affected.

Mixing the fuel directly with the dust, provokes a local reducing atmosphere, due to the reaction:

$$C + CaSO_4 \leftrightarrows CaO + SO_2 + CO$$

and this reaction triggers volatile cycles ($SO_2$), that result in operational disturbances.

In U.S. Pat. No. 5,078,594 in the name of James R. Tutt, et al, issued on Jan. 7, 1992, protection is granted to an apparatus to load solid fuel through an opening in the wall of a rotary furnace, including a closing lid with inner and outer portions, which cooperate to define a passage to close the way to a flow of cooling air, when said lid is in the closed position. While the invention protected by this patent is an improvement on the closing lid for the opening in the furnace's body, disclosed by U.S. Pat. Nos. 4,850,290 and 4,930,965, yet the above mentioned disadvantages regarding the two last patents are still to be found.

U.S. Pat. No. 5,086,716 dated Feb. 11, 1992 granted to Fred A. Lafser Jr., covers a system, apparatus, and method to dispose of solid waste that includes a plurality of sealable vessels for solid waste and a rotary furnace, claiming in particular a canon that shoots the vessels into a receptacle along a path usually parallel to the face of the rotary receptacle; as well as a burner to heat-up gases inside the furnace's receptacle, thereby feeding sealed vessels with solid waste into the clinkering zone of the furnace. Also, the operational complexity of this system makes it prone to plugging of the mentioned cannon, with the solid materials that it is pushing.

As can be seen in the above, the operation of this system is complex and the fact that an additional burner is considered, rises considerably the equipment and operational costs, thus it is not a satisfactory solution, apart from having the same disadvantages already mentioned for inventions that feed into the rotary furnace when there is a calciner.

U.S. Pat. No. 5,339,751 in the name of James R. Tutt, issued on Aug. 23, 1994, covers an apparatus and method to load solid fuel inside a rotary furnace, including a burning system that separates a plurality of fuel materials into a series of stages, based on the amount of fuel contained by a module, in order to keep an average amount of the materials located into the furnace, at a pre-selected level.

The system determines the optimal moment to load each fuel module into the furnace.

This invention covers a computer system to control feeding of the fuel module into a rotary furnace in order to maintain optimal fuel values within the rotary furnace and presents loading pipes formed along the external wall of the furnace, for approximately half its length, obviously constituting an operational improvement in the burning operation of the fuel modules, particularly when it comes to materials handling outside a rotary furnace. However, due to the way in which such modules are fed, there is no ground-breaking contribution, since the already known feeding pipes are being used and, thus, the already known disadvantages also remain, especially for furnaces with a calciner.

U.S. Pat. No. 5,377,603 issued on Jan. 3, 1995 in the name of Mr. Theodore J. Reese, covers an improved method for burning supplementary fuel derived from waste mixed to improve cement manufacture, which comprises the stages in which waste is mixed, processing to delay volatiles liberation and loading the mixture within the furnace at some point along the same, in which the furnace gas temperature is enough to decompose the volatile components of solid waste.

Were it not for the specific limitations of combustion variable optimization in rotary furnaces, this patent would not represent any novelty.

In a published Mexican patent application, number 951140 dated Feb. 28, 1995, a process and an apparatus were disclosed and claimed for decomposing waste fuel in the pre-heater for a rotary furnace, together with raw material for cement manufacture. Residue from such combustion, together with calcinated material is fed to a rotary furnace to finalize such combustion. Feeding combustible material to the upper stages (first to third) of a pre-heater, makes it prone to discharging hydrocarbons due to lack of residence time and due to the temperature for combustion of solid materials.

The above mentioned application for patent, evidences the existing interest on the topic of this invention and undoubtedly constitutes a new approach for one of the goals of this invention, except that it takes place through different and very simplified means.

Finally, U.S. Pat. No. 5,549,058 issued on Aug. 27, 1996 to Mr. James R. Tutt, covers a method and apparatus to load complementary fuel in the form of bulk material within cement furnaces through an opening created on the lateral wall of the rotary furnace, including an apparatus to load bulk fuel, which comprises a hopper and a drum that has an open discharge inside the furnace chamber, as well as an air cannon to force bulk material and unload it through the opening inside the rotary furnace.

Although one can acknowledge that this invention has improved means for charging additional fuel material into a rotary furnace, such means is still coupled half-way along the length of a cement rotary furnace, similar to many others of the above mentioned patents. That type of feed still shows disadvantages, for which reason a satisfactory and effective solution has not been achieved. Obviously this invention also shows the same thermodynamic deficiencies that the other inventions with feeds into a rotary furnace mentioned above have.

From all the above, one can deduce that, in spite of the many attempts by industry to make use of waste material combustion in rotary furnaces, as well as for elimination of hazardous waste in such furnaces, the industry still is in need of a highly efficient, easily operated, low cost, system that will better achieve the mentioned goals.

OBJECTIVES OF THIS INVENTION

One of the main goals of this invention is to provide an improved method and apparatus for an efficient recovery of the energy contained in wastes by means of combustion of the same in industrial furnaces.

Another objective of this invention, is to provide an improved method and apparatus to recover energy from industrial waste, by means of combustion in rotary furnaces of the type used in the cement industry.

Still another objective of the invention, is to provide an improved method and apparatus for elimination of hazardous waste in a rotary furnace or similar equipment, in order to burn and disintegrate such waste until non-toxic effluents are obtained, which will produce no atmospheric pollution and no environmental damage.

Still one more objective of this invention consists in providing improved method and apparatus, which features exceeding the methods and apparatus of the previously known technique.

More specifically, an embodiment of this invention burns waste solids in the presence of relatively clean hot air (which typically contains approximately 20% oxygen), which contrasts with the kiln gas with 2 to 3% of oxygen typically employed in prior techniques, and advantageously carries out this combustion in a place very close to a heat sump, such as the calciner. This is how an efficient combustion to burn without polluting emissions is obtained, but also without the need to produce temperature peaks in places where material prone to agglomeration is found.

This system displaces the thermodynamic and stoichiometric boundaries to burn more and better without forming crust and/or rings.

Other objectives and advantages of this invention will be obvious as this description progresses.

GENERAL DESCRIPTION OF THE INVENTION

The above mentioned objectives can be reached by this invention, by means of improved method and apparatus to recover energy from waste, by burning the same in, for example, cement rotary furnaces using a novel method that comprises continuous feed or batch feed of waste materials into the tertiary air duct (from the clinker cooler) of a cement rotary furnace; burning such waste within the duct itself (preferably relatively close to its discharge for ash generating materials) and passing decomposition/combustion gases to a calciner or even a preheater. The solid waste residues are advantageously either fed ultimately to the furnace entrance and mixed with the raw materials for cement manufacture, or are collected separately to be eliminated independently (optionally to be processed to remove detritus such as the steel wires from car tires and to recycle any remaining inerts etc. that are compatible in cement).

Preferably the method of the invention utilizes the energy content of an at least partially combustible organic-containing waste in a system for heat treating inorganic particles in a rotary furnace, by subjecting the raw inorganic particles to at least one of preheating and calcining; thereafter heat treating the inorganic particles at a higher temperature in the rotary furnace; cooling with air the inorganic particles discharged from the rotary furnace in a manner to elevate the temperature of at least a first portion of the air sufficiently to be capable of decomposing the combustible portion of the waste; flowing the hot exhaust gases from the rotary furnace to use in at least one of the preheating and calcining steps; flowing through a tertiary air duct said hot first portion of the air used to cool the inorganic particles discharged from the rotary furnace; feeding the waste, continuously or in batches, into the tertiary air duct at a position therealong, at a rate, and in a condition so as to be effectively largely decomposed and at least partially burned by the hot air flowing therethrough; discharging from the tertiary air duct any air and the resulting decomposition and combustion gases to feed ultimately at least one of the preheating and calcining steps wherein the burning of any decomposition gases is completed; and removing from the tertiary air duct any solid residues remaining therein from the decomposed waste.

Similarly, apparatus according to the preferred embodiments of the invention for utilizing the energy content of an at least partially combustible organic-containing waste in a system for heat treating inorganic particles, comprise: a rotary furnace having a charge end and a discharge end; an air cooler at the discharge end; at least one of an external calciner and an external preheater; an exhaust gas duct between the discharge end of the furnace and at least one of an external calciner and an external preheater; a tertiary air duct for conveying hot air at incinerating temperatures from said cooler towards at least one of an external calciner and an external preheater and with the air duct being in flow communication therewith; feed mechanism for external charging of the waste into said tertiary air duct; and separating mechanism for removing from the tertiary air duct any solid residues remaining therein from decomposed waste.

The novelty item of this invention is embodied by a plurality of means and devices discussed more fully below that permit feeding the above mentioned industrial waste or by-product to a tertiary air duct of the rotary furnace by means of gates to control such bulk or crushed solid feed as well as devices that allow burning such waste at high temperature and to separate solid residue to be eliminated from the duct.

DETAILED DESCRIPTION OF PREFERRED EMBODIMENTS OF THE INVENTION

A detailed description of this invention will be provided hereafter, and reference will be made to drawings above, in which arabic numbers have been included to identify the elements of parts of the novel apparatus, and such numbers of those parts coincide with the description following.

Figure 1:
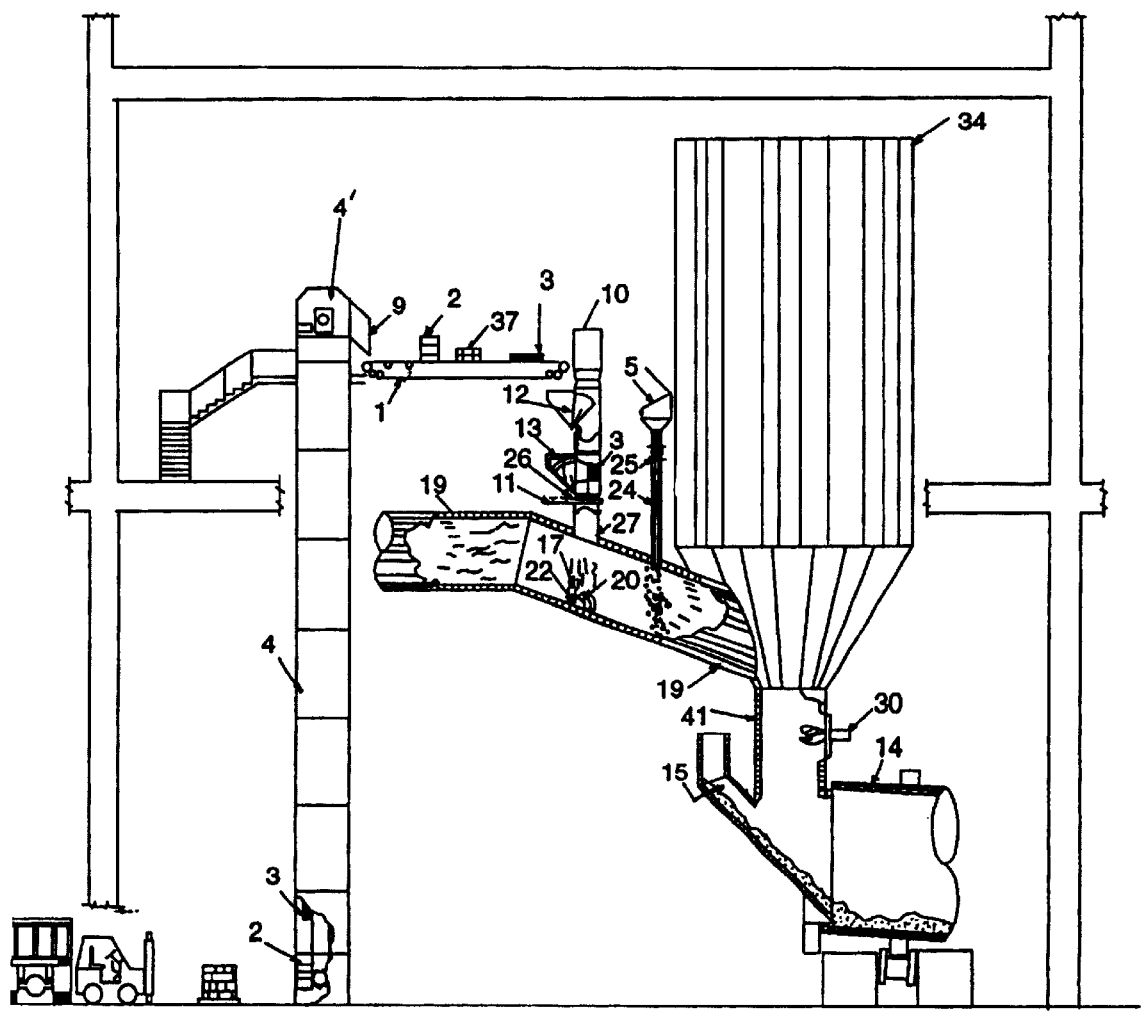
FIG. 1 is a partially sectioned side elevational diagrammatic view that shows a portion of a cement manufacturing plant embodying the invention, especially the burner zone with tertiary air duct at the calciner section together with the raw materials and fuel feeds at the entrance of a rotary furnace.

As shown in FIG. 1, in accordance with the novel method and apparatus of this invention, the bulk or crushed solid material that is to be used for recovery of its energy by means of combustion, is batch fed to the tertiary air duct 19. The solid material (such as a container 2 or tire 3) is placed inside an elevator 4 and elevated thereby to point 4' thereof to an unloading station 9. There it is loaded onto a belt conveyor 1, that feeds the material (shown as container 2, tires 3, or even bales of solid material 37) to a first vertical feed hopper 10. At the bottom of the hopper 10 are some gates 12 and 13, used to control the feed of the solid waste material, and which serve also to isolate the atmosphere in the combustion zone by means of a knife gate 11 and the valve 26, to prevent entrance of false air (i.e. unregulated outside air that could cause hot spots) into the zone through the charging opening 27.

The incomplete combustion products 17, their combustion gases 20, and the combustion products themselves 22 of the tires, bales, bags, or drums are shown in the hot tertiary air duct 19 in which they burn at a temperature usually over 700° C. (to as high as 950° C. or even more), and with typically 20% oxygen by volume and high turbulence. This combustion heat may be taken advantage of to complete the energy supply into the upstream equipment 34 (which can be a calciner and/or a preheater). The remaining solid waste fuel residues are displaced passing through the ascending duct 41 (that has a burner 30) and falling into the entrance of the rotary furnace 14 (either directly or carried upwardly by the gas flow in duct 41 into the calciner and therebeyond separated by a cyclone separator, not shown in FIG. 1 (see FIGS. 5 or 6), in the usual preheater to be returned with the preheated and calcinated raw materials 15 via feed tube 16) to be ultimately incorporated into the raw materials 15 in said rotary furnace 14.

In the case where crushed material is fed, the same is inserted by means of a second hopper 5, also shown in the upper intermediate section in FIG. 1. Such feed is controlled by means of a rotary valve 25 that allows the crushed material to pass by way of duct 24, to be burned in the tertiary air duct 19 and in calciner 34. Most of the decomposition and at least a part of the combustion takes place in the duct 19, with a very little amount of hydrocarbons being detectable in the final effluent from the system. For example, entrained soot particles will be burned ultimately in the calciner, preheater, or (if large enough) down in the furnace.

Ashless waste material could be fed to the tertiary air duct nearly anywhere therealong. For mechanical reasons, the feed to the duct preferably should be about 1 to 5 meters from its discharge end. Since feeding waste material to the exhaust gas outlet results in build up of encrustations (requiring periodic plant shut down for removal, which does not occur with waste fed to the tertiary air duct). The feed to the tertiary air duct should be sufficiently remote from the duct discharge into the exhaust gas to allow adequate residence time of the waste-derived products in the duct 19 to prevent such build up from occurring (by having the decomposition be well established in the duct 19 prior to any mixing with the exhaust gas).

Figure 2:
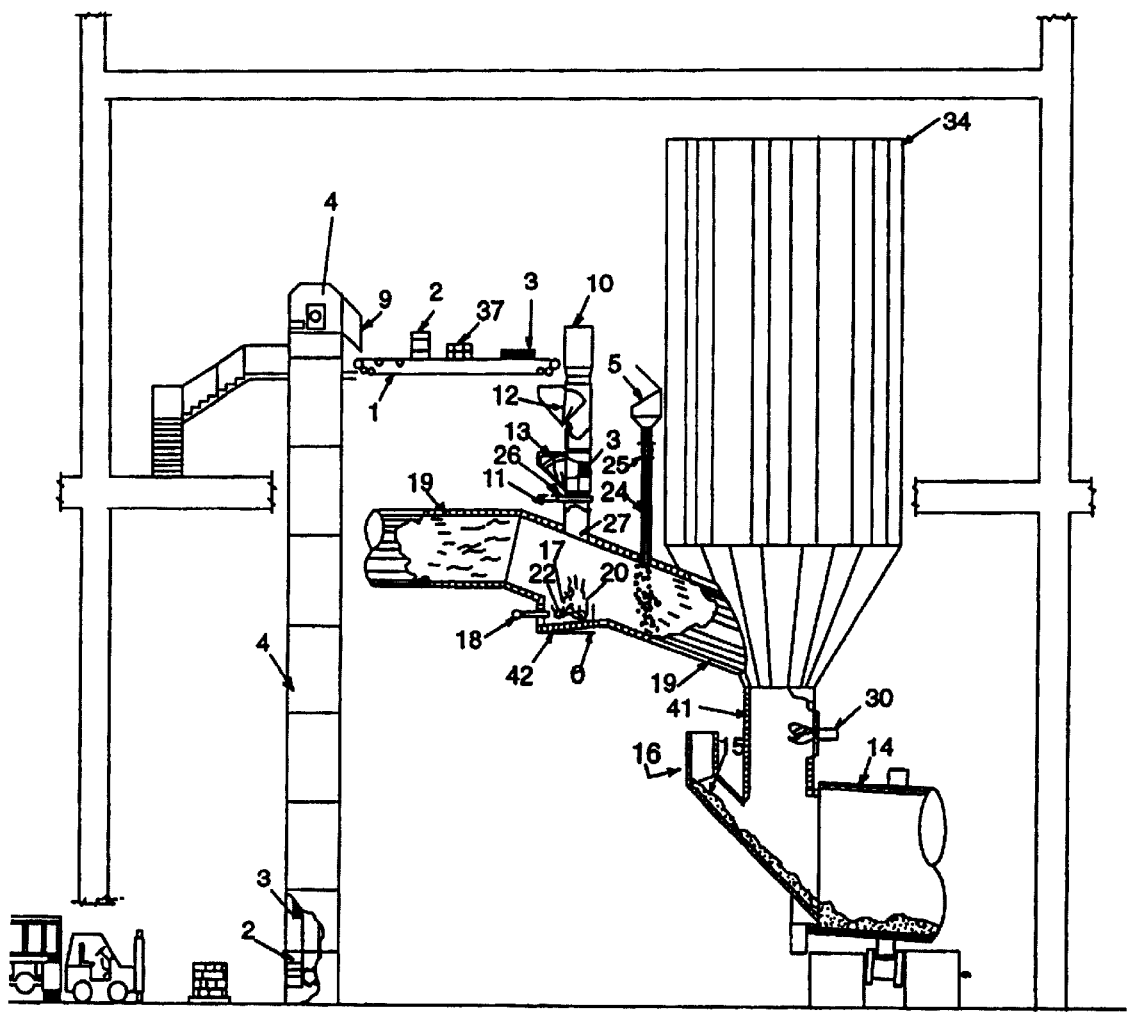
FIG. 2 is a diagrammatic view similar to FIG. 1 showing an alternate preferred embodiment of the invention (with a modified burner zone)

Referring now to FIG. 2, this figure shows an alternative mode of the invention with respect to that shown in FIG. 1. In this mode, the solid material to be burned follows the same path mentioned above, until it falls to a graded inner hearth with a combustion surface 42 formed by the lower part of duct 19, which discharges into calciner 34. The hearth 42 has a graded angle θ which prevents the solid fuel material from falling all the way ultimately to the entrance of rotary furnace 14. In order to regulate the period of residence of such material in duct 19 of the tertiary air, an air blower 18 of the type known as an "air blaster" may be incorporated. This blaster 18 may also serve to clean ashes or residues that could be left behind in the aforementioned surface 39, as a result of combustion.

Solids may also be introduced mechanically into duct 19 to hearth 42 by means of a pushing device, such as by a screw feed, or a pneumatic or hydraulic piston (not shown).

A second alternative of the novel invention of this application will be described with reference to FIG. 3. For simplicity, only the difference between this mode and that shown in FIG. 1 will be mentioned.

Within the tertiary air duct 19, solid fuel material is dropped directly on the upper combustion surface of a swing gate valve 39, to burn in full or in part and take advantage of its heating energy to aid in carrying out the reactions that take place in calciner 34.

In case the waste fuel material is only partially burned, the residue containing, among other products, coal, volatiles and ashes, can be discharged through the swing valve 39 and by means of a Y duct 36 that serves to separate such residue, so that it will be passed to complete volatiles emission, crush it, cool it in one or more mills 28 and have the volatiles returned to duct 19 of the tertiary air by means of an ascending duct. The operation in Y duct 36 is alternated by means of valves 8, preferably of the blade type, as well as a diversion gate 35, and there may be a vent pipe 40 that connects the Y type ducts 36 with duct 19.

Residuals that still hold a high calorific power are collected in mobile deposits 32 (and may be later processed) by passing them into a feeding chamber 29, then into a hopper 31 and finally into a mill 28 to reduce particle size by means of teeth 33 until they become a size that can be, for example, 100 microns. Their passage is controlled by means of seals 38. Later on, they are sent into conventional containers identified with number 21.

By reference to FIG. 4, a description will now be made of a third alternative to the invention, whose basic concept is equivalent to that of the second alternative mode shown in FIG. 3, except that this third alternative mode is applicable to the case in which the calciner 34 is in a higher position relative to the rotary furnace 14, for which the shape of the tertiary air duct 19, instead of being directed downwards would have an upward direction. This requires that minor adjustments be made to components connecting into such tertiary air duct 19, as is the case of the vent duct 40 which obviously needs to be longer, even though it keeps the same shape of the second mode shown in FIG. 3.

The above configuration is important, since it avoids dropping solid fuel products into the rotary furnace 14 in case a mechanical failure is encountered in the slope, such as could occur when duct 19 has a descending grade.

Figure 4:
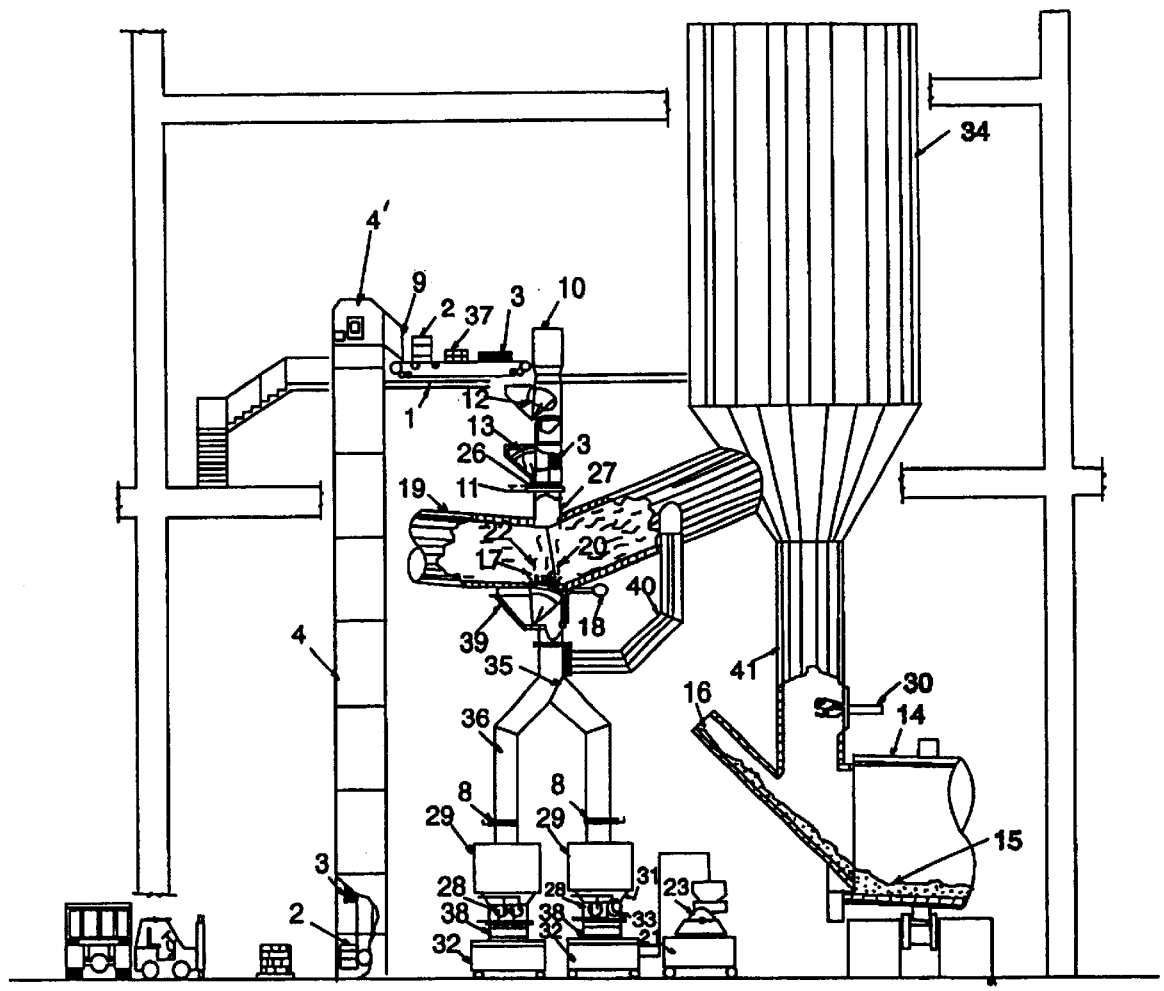
FIG. 4 is a diagrammatic view similar to FIG. 3, showing a third alternative preferred embodiment of this invention, this latter mode being especially appropriate when fuel solids or ashes are not required to enter the furnace, since they slide back in the final rising portion of the tertiary air duct.

It is important to note that although solid fuel feed is shown in FIG. 4 in a site where the tertiary air duct 19 changes into an ascending grade, this invention is applicable to any feeding position of said tertiary air duct 19, since this permits temperature changes and residence period regulation as may be required to crack volatile molecules into their simpler unharmful components.

Figure 3:
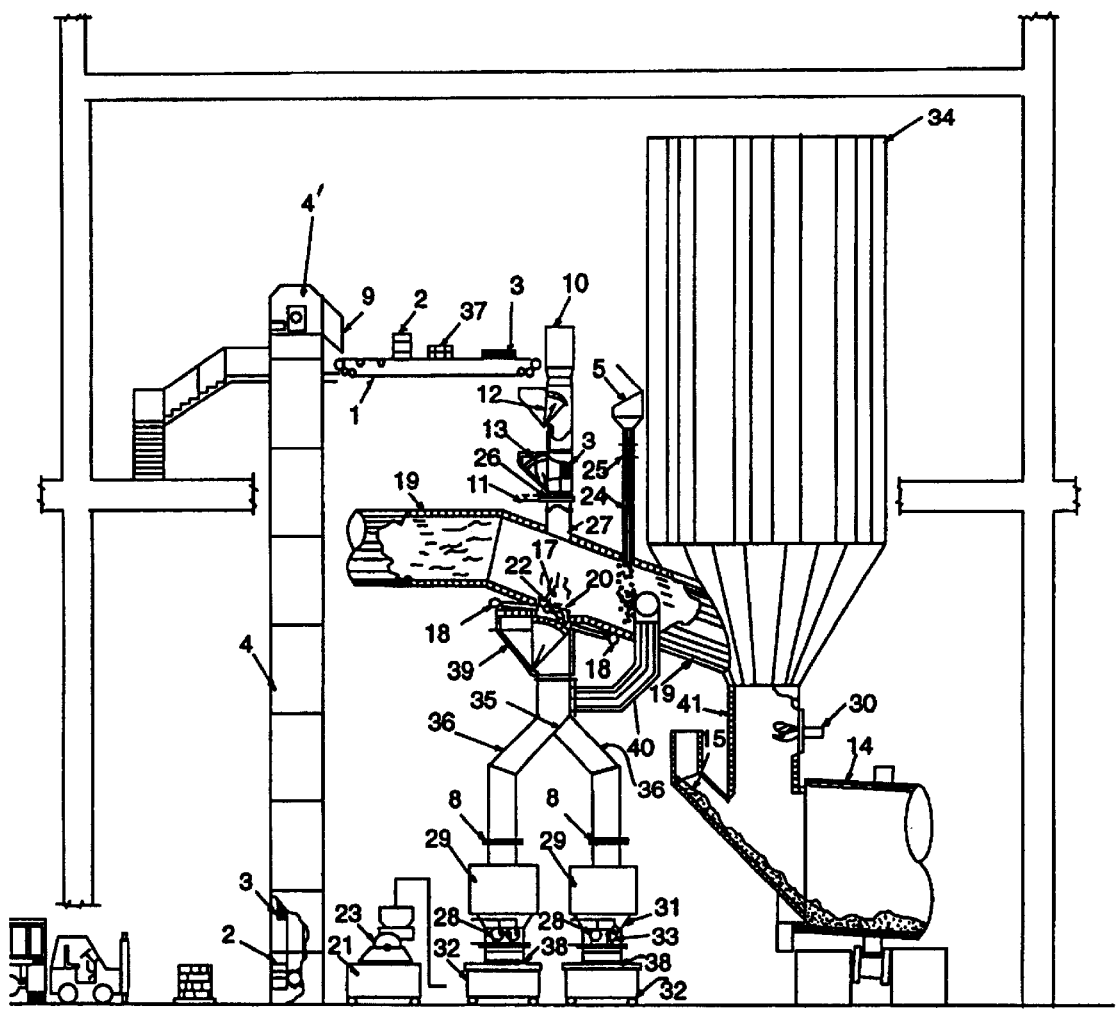
FIG. 3 is a diagrammatic view similar to FIGS. 1 and 2 where a second alternate preferred embodiment of the invention is shown (with separate waste residue discharge)

Another difference in the drawing for this third mode relative to the drawing for the second mode, lies in the fact that the feeding assembly 5 for crushed solid material is not shown and that location of mill 23 and its corresponding container for pulverized solids location is on the right hand side of the feeding chambers 29, instead of the position at the left of the same in FIG. 3.

Figure 5:
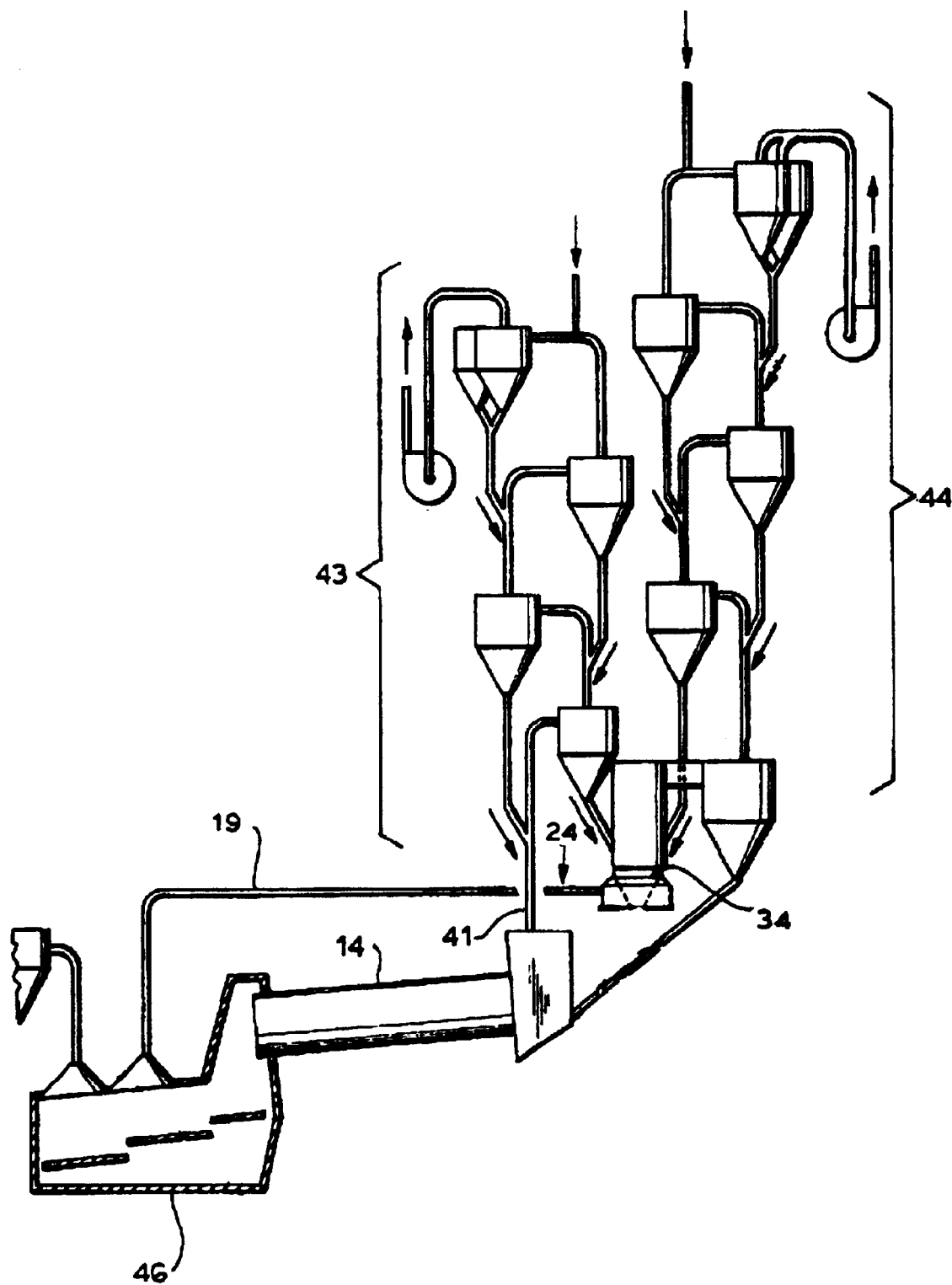
FIG. 5, showing a fourth alternative preferred embodiment of this invention, is a diagrammatic view of a typical installation for producing clinker cement with two parallel preheaters (comprised of the usual cascade of cyclone separators), one fed by hot gas from the calciner (which shows the modified embodiment of the invention) and the other fed by the exhaust gas from the rotary kiln.

Finally, in the fourth alternative to the invention shown in FIG. 5, the tertiary air duct 19 feeds into calciner 34 directly, and not into the exhaust gas duct 41 from the kiln 14. Thus the added energy derived from the burned waste is given up to the calciner 34 and from there to the preheater 44. The duct 41 with the hot exhaust gas from the kiln 14 alone feeds into the preheater 43 (so that the kiln exhaust gas and the decomposed gas from the burned waste in the tertiary air duct 19 do not mix in this embodiment). As seen in this drawing, the hot air in the tertiary air duct 19 is drawn from the clinker cooler 46 and is used to decompose and at least partially burn the waste fed in at feed conduit 24.

In yet a fifth alternative, these feeds in ducts 19 and 41 as shown in FIG. 5 could be reversed (with the duct 19 feeding into the lowermost cyclone separator of the preheater 43 and the exhaust gas duct 41 of the kiln 14 feeding into the calciner 34).

Figure 6:
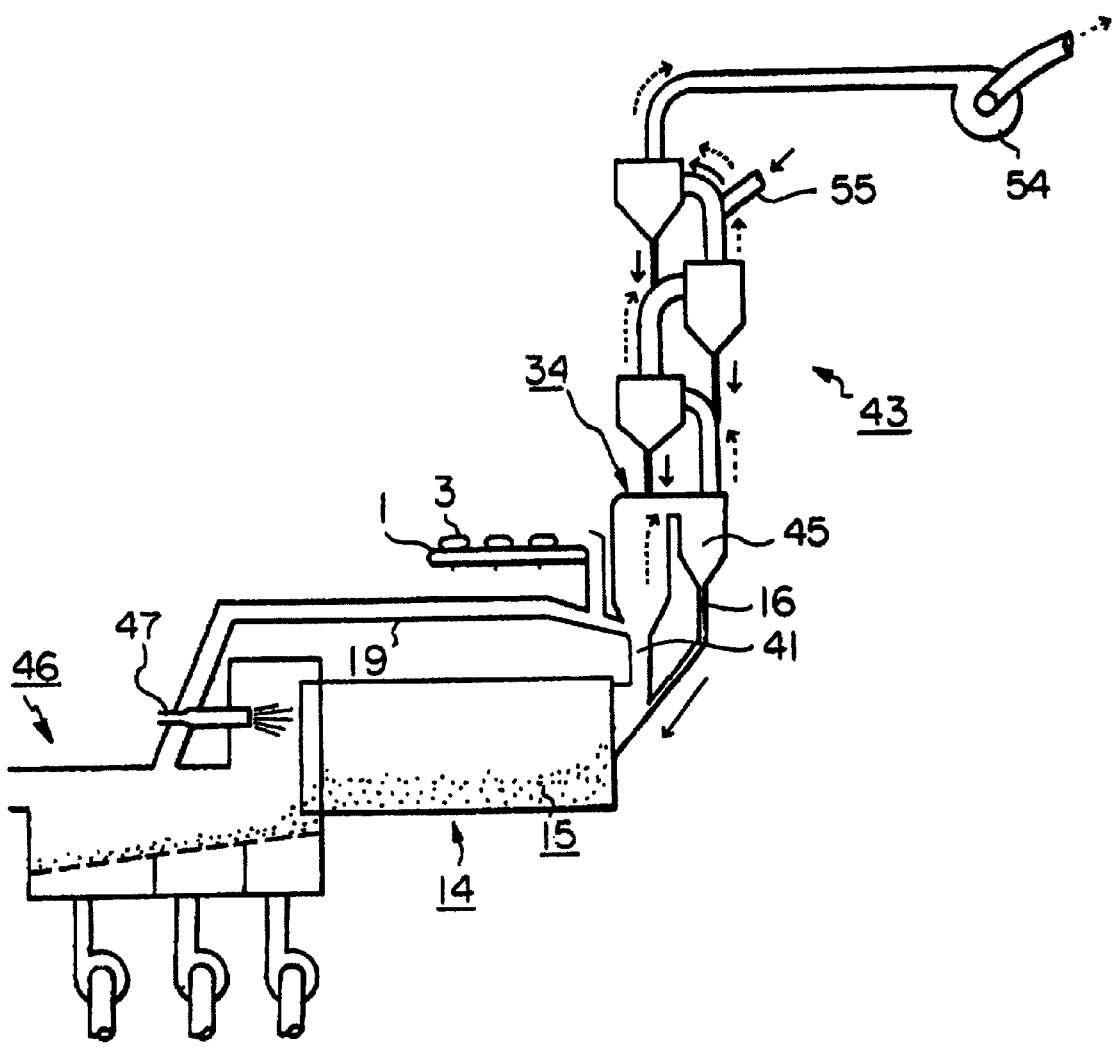
FIG. 6, showing still another alternative preferred embodiment of this invention, is a diagrammatic view (also not drawn to scale) of a typical installation for producing cement clinker, modified to incorporate the invention in a manner similar to FIG. 1, but showing in addition the clinker cooler, a single preheater system (which is upstream of the calciner, relative to the flow of the solid particles, and which is comprised of the usual cascade of cyclone separators), etc., and where the tertiary air duct feeds directly into the ascending kiln exhaust gas duct (that extends from the kiln to the calciner).

Still another alternative preferred embodiment of this invention is shown in FIG. 6. This is similar to FIG. 5, but is a more traditional configuration, where ascending exhaust gas duct 41 from the kiln 14 feeds into the bottom conical portion of the calciner 34 (in the manner shown in FIGS. 1 to 3) and is joined by the outlet from the tertiary air duct 19 (that also feeds into the bottom of the calciner 34). The single preheater 43 is downstream of the gas flow (shown by dotted line arrows) and upstream of the raw material flow (shown in solid line arrows). The arrows show the flow patterns through the preheater 43 that will be readily recognized by those skilled in the art. The preheated raw material is roasted in the kiln 14 by the main burner 47. The raw material is fed to the preheater 43 via feed inlet 55. The hot effluent gas from the kiln 14 via the calciner 34, cooled by heat exchange with the raw material in the preheater 43, exits via the exhaust blower 54.

The above description must be considered only to illustrate the invention and in no way as a limitation, since it needs to be understood that the same is susceptible of variations and modifications within its scope, which is to be defined only by the claims hereinafter set forth.

What is claimed is:

1. A method to utilize the energy content of an at least partially combustible organic-containing waste in a system for heat treating inorganic particles in a rotary furnace, comprising:

subjecting the raw inorganic particles to at least one of the steps of preheating and calcining;

thereafter heat treating the inorganic particles at a higher temperature in the rotary furnace;

cooling with air the inorganic particles discharged from the rotary furnace in a manner to elevate the temperature of at least a first portion of the air sufficiently to be capable of decomposing the combustible portion of the waste;

flowing the hot exhaust gases from the rotary furnace to use in at least one of the preheating and calcining steps;

flowing through a tertiary air duct said hot first portion of the air used to cool the inorganic particles discharged from the rotary furnace;

feeding the waste, continuously or in batches, directly into the tertiary air duct at a position therealong, at a rate, and in a condition so as to be effectively largely decomposed and at least partially burned by the hot air flowing therethrough;

discharging from the tertiary air duct any air and the resulting decomposition and combustion gases ultimately to feed at least one of the preheating and calcining steps wherein the burning of any decomposition gases is completed; and removing from the tertiary air duct any solid residues remaining therein from the decomposed waste.

2. A method according to claim 1, wherein the inorganic particles are cement precursors which are burned into clinkers in the rotary furnace.

3. A method according to claim 2, wherein the cement precursors are pretreated by both the steps of preheating and calcining.

4. A method according to claim 3, wherein the preheating step precedes the calcining step in series, the hot exhaust gases are flowed from the furnace to the calcining step directly and the tertiary air duct discharges into the flow of hot exhaust gases.

5. A method according to claim 2, wherein the solid residues removed from the tertiary air duct are ultimately charged into the rotary furnace.

6. A method according to claim 2, wherein the solid residues removed from the tertiary air duct are ultimately discharged from the system apart from the inorganic particles discharged from the rotary furnace.

7. A method according to claim 2, wherein at the point where the waste is fed to the tertiary air duct the air has a temperature over 700° C. and has a content on the order of at least 20% oxygen by volume.

8. A method according to claim 7, wherein at the point where the waste is fed to the tertiary air duct is at a distance of at least 1 meter from the discharge end of the tertiary air duct.

9. A method according to claim 8, wherein at the point where the waste is fed to the tertiary air duct is at a distance of between 1 to 5 meters from the discharge end of the tertiary air duct.

10. A method according to claim 9, wherein the waste is externally fed to the tertiary air duct in either bulk or shredded form through gas tight feeds to prevent the introduction of false air into the system.

11. An apparatus for utilizing the energy content of an at least partially combustible organic-containing waste in a system for heat treating inorganic particles, comprising:

a rotary furnace having a charge end and a discharge end, an air cooler at the discharge end, at least one of an external calciner and an external preheater, an exhaust gas duct between the discharge end of the furnace and at least one of an external calciner and an external preheater, a tertiary air duct for conveying hot air at incinerating temperatures from said cooler towards at least one of an external calciner and an external preheater and with the air duct being in conduit flow communication with at least one of an external calciner and an external preheater, feed mechanism for external charging of the waste directly into said tertiary air duct, separating mechanism for removing from the tertiary air duct any solid residues remaining therein from decomposed waste.

12. An apparatus according to claim 11 for the manufacture of cement, wherein the rotary furnace is a cement kiln, the air cooler is a clinker cooler, the exhaust gas duct connects to a calciner, and the tertiary air duct connects to the exhaust gas duct.

13. An apparatus according to claim 12, further comprising at least one preheater in the form of a cascade of cyclone separators upstream of the calciner in the sense of the flow of the particles.

14. An apparatus according to claim 13, wherein the tertiary air duct ascends as such duct joins the exhaust gas duct.

15. An apparatus according to claim 13, wherein the tertiary air duct descends as such duct joins the exhaust gas duct.

16. An apparatus according to claim 13, further comprising a combustion surface with a graded hearth formed within the lower part of the tertiary air duct below the feed mechanism to receive waste therefrom.

17. An apparatus according to claim 16, wherein the separating mechanism includes an air blaster that serves to clean ashes or other waste residue that may remain on the lower surface of the tertiary air duct.

18. An apparatus according to claim 13, wherein the feed mechanism is adapted to handle bulk waste batches to be delivered into the tertiary air duct for burning in the system which includes an elevator to raise the batches, an unloading station, a conveyor belt to receive the batches from the unloading station and deliver into a vertical feed hopper, which is coupled to the tertiary air duct by an alternating double valve for isolating the duct from the external environs.

19. An apparatus according to claim 18, wherein the feed mechanism includes a second hopper and a rotary valve to control feeding of crushed waste into the tertiary air duct.

20. An apparatus according to claim 18, wherein the separating mechanism includes a Y-shaped duct with a diversion gate to alter the flow of residues between the two separate ducts that are the legs of the Y-shaped duct and a valve at each leg to control the discharge of such flow through the respective leg.

21. An apparatus according to claim 20, wherein a vent duct is connected between the Y-shaped duct and the tertiary air duct to return to the tertiary air duct any volatiles that are given off from solid residue in the Y-shaped duct.

22. An apparatus according to claim 21, further comprising mobile receptacles positionable to receive discharge of residues from the Y-shaped ducts for further treatment and re-use.

23. A method according to claim 4, wherein the solid residues removed from the tertiary air duct are ultimately charged into the rotary furnace.

24. A method according to claim 4, wherein the solid residues removed from the tertiary air duct are ultimately discharged from the system apart from the inorganic particles discharged from the rotary furnace.

25. A method according to claim 4, wherein at the point where the waste is fed to the tertiary air has a temperature over 700° C. and has a content on the order of at least 20% oxygen by volume.

26. A method according to claim 3, wherein the preheating step precedes the calcining step in series, the hot exhaust gases from the furnace and gases from the tertiary air duct are separately flowed directly to the calcining step.

27. An apparatus according to claim 11 for the manufacture of cement, wherein the rotary furnace is a cement kiln, the air cooler is a clinker cooler, the exhaust gas duct connects to a calciner, and the tertiary air duct also connects to the calciner.

28. An apparatus according to claim 12, further comprising at least one preheater in the form of a cascade of cyclone separators upstream of the calciner in the sense of the flow of the particles, and wherein the tertiary air duct ascends as such duct joins the calciner.

29. An apparatus according to claim 12, further comprising at least one preheater in the form of a cascade of cyclone separators upstream of the calciner in the sense of the flow of the particles, wherein the tertiary air duct descends as such duct joins the calciner.

* * * * *